(12) United States Patent
Kikuchi et al.

(10) Patent No.: US 6,479,912 B2
(45) Date of Patent: Nov. 12, 2002

(54) AUTOMATIC BALANCING APPARATUS

(75) Inventors: Yoshimi Kikuchi, Shimosuwa-machi (JP); Daisuke Higuchi, Shimosuwa-machi (JP); Yeoh Kian Hock, Shimosuwa-machi (JP)

(73) Assignee: Sankyo Seiki Mfg. Co., Ltd., Nagano (JP)

( * ) Notice: Subject to any disclaimer, the term of this patent is extended or adjusted under 35 U.S.C. 154(b) by 47 days.

(21) Appl. No.: 09/764,964

(22) Filed: Jan. 17, 2001

(65) Prior Publication Data

US 2001/0038601 A1 Nov. 8, 2001

(30) Foreign Application Priority Data

Jan. 18, 2000 (JP) .......................................... 2000-009409
Jan. 20, 2000 (JP) .......................................... 2000-012256

(51) Int. Cl.[7] .......................... G11R 19/20; F16C 32/04; H02K 7/04
(52) U.S. Cl. ...................... 310/51; 369/256; 360/99.12; 417/423.7
(58) Field of Search ........................................... 310/51

(56) References Cited

U.S. PATENT DOCUMENTS 6,005,749 A * 12/1999 Ikuta et al. ............... 360/99.12
6,249,505 B1 * 1/2001 Miamato ..................... 369/266
6,205,110 B1 * 3/2001 Miamato ..................... 369/266

* cited by examiner

*Primary Examiner*—Thomas M. Dougherty
*Assistant Examiner*—Iraj A Mohandesi
(74) *Attorney, Agent, or Firm*—Reed Smith LLP

(57) ABSTRACT

An automatic balancing apparatus which includes a support shaft which is rotated by a drive; a case body which is fixed to the support shaft and which rotates together with the support shaft; a ring magnet which is placed at the inside corner, in the radial direction, of an inner space of the case body; and a balancing member. The balancing member further includes a plurality of magnetic bodies which are movable in the inner space of the case body and which can be drawn up by the magnetic field of the ring magnet. When the rotational frequency of a rotor, which rotates together with the case body, exceeds the resonant frequency, the automatic balancing apparatus reduces vibrations of the rotor; and the outer circumference of the ring magnet has a flat portion.

22 Claims, 5 Drawing Sheets

FIG. 8 y1: at first operating portion
y2: at second operating portion
y3: at outermost wall portion

AUTOMATIC BALANCING APPARATUS

RELATED PATENT APPLICATIONS

This application claims priority of Japanese Patent Application No. 2000-009409 filed on Jan. 18, 2000 and of Japanese Patent Application No. 2000-012256 filed on Jan. 20, 2000. The complete disclosures of both applications are hereby incorporated by reference.

FIELD OF THE INVENTION

The present invention relates to an automatic balancing apparatus which reduces vibrations of a rotational shaft during the rotation of a rotor such as a motor.

BACKGROUND OF THE INVENTION

Many electric appliances, such as computers, are such that a rotor is rotated by a motor and the like. For example, a recording and regenerating apparatus placed in a computer and a CD player has a mechanism to rotate a disc as a recording medium. In recent years, such apparatus are required to accommodate super high speed rotations of 6,000 to 10,000 rpm. Therefore, vibrations of the rotor occur especially when it rotates at a high speed as the rotation exceeds the resonant frequency. The rotational vibration (end play) results in a variety of problems, such as tracking errors.

Figure 1:
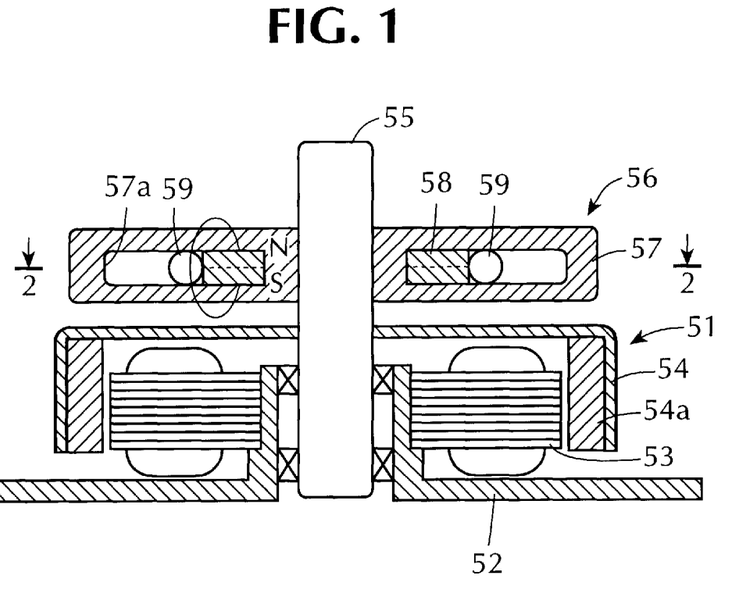
FIG. 1 is a vertical section of a spindle motor having a conventional rotation control apparatus.
Figure 2:
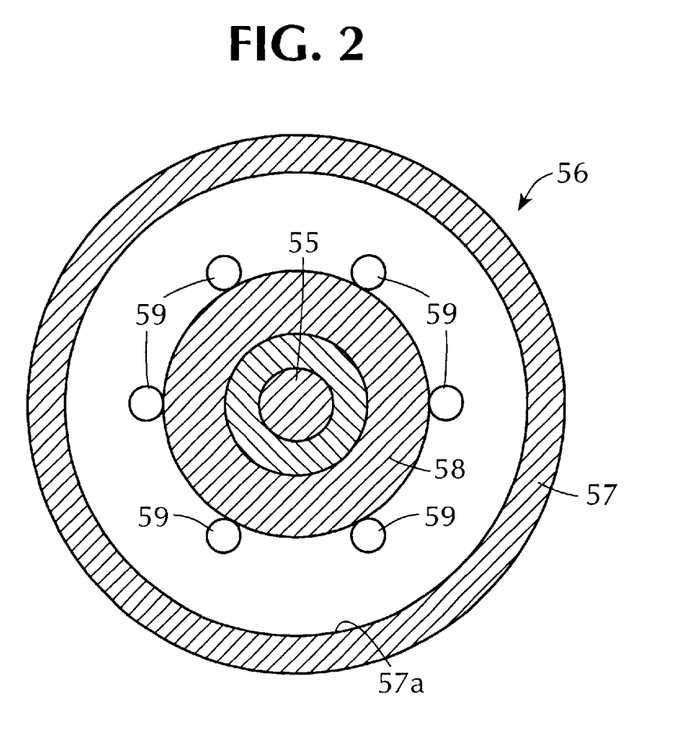
FIG. 2 is a cross section of the rotation control apparatus in FIG. 1 at VIII—VIII.

As a solution to the above issue, for example, a rotation control apparatus is suggested in Tokkai H10-257710. FIG. 1 is a longitudinal section of a spindle motor to which the rotation control apparatus of Tokkai H10-257710 is attached. FIG. 2 is a cross section of a main part of the rotation control apparatus.

As shown in FIG. 1, spindle motor 51 is comprised of: stator 53 which is fixed to hub 52; rotor 54 which has permanent magnet 54a placed across from stator 53; and spindle shaft 55 which is fixed to the center of rotation of rotor 54. When stator 53 is magnetized as electricity flows therein, the magnetic field, which rotates rotor 54, is generated between stator 53 and rotor 54. As a result, rotor 54 rotates together with spindle shaft 55.

Rotation control apparatus 56, as shown in FIGS. 1 and 2, is comprised of case 57, which is mounted to spindle shaft 55 such that spindle shaft 55 passes through the inside, and a turntable (not shown in the figures). Case 57 and the turntable rotate together with spindle shaft 55.

A ring-shaped space is formed around the shaft inside case 57, and magnet 58 is placed at the innermost portion of the space. Magnet 58 is bipolarly magnetized in the vertical direction (the axial direction of spindle shaft 55). Additionally, a plurality of balancer balls 59, made of a magnetic body, are placed on the outer circumference of magnet 58 in the space of case 57. Balancer balls 59 are drawn up and fixed to the outer circumference of magnet 58 by the magnetic force.

With rotation control apparatus 56 as configured above, balancer balls 59 rotate together with spindle shaft 55 (or rotor 54) while being fixed on the outer circumference of magnet 58 when spindle motor 51 is started. Once the rotational speed of spindle shaft 55 (or rotor 54) gradually increases and exceeds the resonant frequency, balancer balls 59 are separated from magnet 58 and move towards the outer wall 57a of case 57. As a result, the rotational vibrations of spindle shaft 55 (or rotor 54) are reduced by the effect of balancer balls 59.

As described above, the rotation control apparatus 56 of Tokkai H10-257710 reduces the rotational vibrations of spindle shaft 55 (or rotor 54) when the rotational speed of spindle shaft 55 of spindle motor 51 increases and exceeds the resonant frequency. As a result, tracking errors and the like can be prevented.

However, such an apparatus has a configuration in which the outer circumference of magnet 58 is bipolarly magnetized in the axial direction such that balancer balls 59 are fixed to the outer circumference of magnet 58 when the rotation is less than the resonant frequency. Therefore, balancer balls 59 are not placed on the outer circumference of magnet 58 with equal distance from each other, for example bunching up together, when spindle motor 51 is suspended. As a result, the rotational center is deviated when the motor is resumed, causing a loss of balance in the rotation. Consequently, the rotational characteristics of the apparatus are lowered when the motor is in motion.

Moreover, balancer balls 59 are fixed on the spherical outer circumference of disc-shaped magnet 58 only by the magnetic force. This means that the force of magnet 58 to hold balancer balls 59 is weak in the tangential direction. Hence, fixation the fixing force (holding force) to balancer balls 59 is weak at the beginning of the rotation, and balancer balls 59 tend to shift in the circumferential direction with the centrifugal force at the beginning of the rotation. In addition to the deviation of the rotational center, bumping sounds are caused when balancer balls 59 collide with each other. Further, the shift of balancer balls 59 at the beginning of the rotation tends to amplify the vibration at the rotational center, causing a decrease in the rotational characteristics when the apparatus is started.

Rotation control apparatus 56 as described above reduces the rotational vibrations when the rotation of rotor 54 exceeds the resonant frequency. However, when the speed of rotor 54 continually increases and exceeds a given value, the apparatus can no longer control the vibration. In other words, a range of rotation in which balancer balls 59 shift in the circumferential direction but on the same radius line to reduce the rotational vibrations is limited to a given band of rotational frequencies. Therefore, once the rotation reaches the given speed, the effect of reducing the rotational vibrations cannot be performed.

One may reduce the rotational vibrations in a rotational range with higher speed by establishing the resonant frequency of rotor 54 higher than as described above. However, with such establishment, balancer balls 59 do not function to reduce the rotational vibrations until the speed reaches the resonant frequency, rather they increase the vibrations. Therefore, the rotational vibrations become at low rotation speed, less than the resonant frequency become an issue.

Hence, the present invention intends to provide an automatic balancing apparatus which prevents a decrease in the rotational characteristics when a motor is started by firmly fixing balancer balls on the outer circumference of a magnet with equal distance from each other when the motor is at rest.

Additionally, the present invention intends to provide an automatic balancing apparatus which reduce rotational vibrations corresponding to any rotational speed, such as in the case of the low speed rotation, when the rotation of the rotational body is less than the resonant frequency, and in the case of the super-high speed rotation, when the rotation exceeds a given value above the resonant frequency, as well as in any other cases.

SUMMARY OF THE INVENTION

In accordance with one aspect of the invention, an automatic balancing apparatus is disclosed which comprises: a support shaft which is rotated by a drive; a case body which is fixed to the support shaft and which rotates together with the support shaft; a ring magnet which is placed at the inside corner, in the radial direction, of an inner space of the case body; and a balancing member, the balancing member further comprising a plurality of magnetic bodies which are movable in the inner space of the case body and which can be drawn up by the magnetic field of the ring magnet; wherein, when the rotational frequency of a rotor, which rotates together with the case body, exceeds the resonant frequency, the automatic balancing apparatus reduces vibrations of the rotor; and the outer circumference of the ring magnet has a flat portion.

In accordance with another aspect of the invention, an automatic balancing apparatus is disclosed which comprises: a support shaft which is rotated by a drive; a case body which is fixed to the support shaft and which rotates together with the support shaft; a ring magnet which is placed at the inside corner, in the radial direction, of an inner space of the case body; and a balancing member, where the balancing member further comprises a plurality of magnetic bodies which are movable in the inner space of the case body and which can be drawn up by the magnetic field of the ring magnet; wherein, when the rotational frequency of a rotor, which rotates together with the case body, exceeds the resonant frequency, the automatic balancing apparatus reduces vibrations of the rotor; and the outer circumference of the ring magnet has a number of magnetized portions wherein the number of the magnetized portions is equal to or higher than the number of the balancing member.

In accordance with yet another aspect of the invention, an automatic balancing apparatus is disclosed which comprises: a support shaft which is rotated by a drive; a case body which is fixed to the support shaft and which rotates together with the support shaft; and a plurality of balancer members which are movable in a inner space of the case body; wherein, when the rotational frequency of a rotor, which rotates together with the case body, exceeds the resonant frequency, the automatic balancing apparatus (1) reduces vibrations of the rotor; and (2) the inside of the case body has (i) a holding portion which prevents the plurality of balancer portions from moving outward in the radial direction when the rotor is at rest and at the beginning of the rotation of the rotor; (ii) a first operating portion which reduces vibrations of the rotor by preventing the plurality of balancer members from further shifting outward in the radial direction when the shift of the balancer members occurs with the holding force of the holding portion as the rotational frequency of the rotor exceeds the resonant frequency; and (iii) a second operating portion which reduces vibrations of the rotor, rotating at a rotational frequency exceeding a given value, by preventing the balancer members from further shifting outward in the radial direction beyond the first operating portion when the rotational frequency of the rotor exceeds the given value which is beyond the resonant frequency.

In accordance with still another aspect of the invention, an automatic balancing apparatus is disclosed which comprises: support shaft which is rotated by a drive; a case body which is fixed to the support shaft and which rotates together with the support shaft; a ring magnet which is placed at the inside corner, in the radial direction, of an inner space of the case body; and a balancing member, where the balancing member further comprises a plurality of magnetic bodies which are movable in the inner space of the case body and which are drawn up by the magnetic field of the ring magnet; wherein, when the rotational frequency of a rotor, which rotates together with the case body, exceeds the resonant frequency, the automatic balancing apparatus reduces vibrations of the rotor; and the outer circumference of the ring magnet has a flat portion.

In accordance with even still another aspect of the invention, an automatic balancing apparatus is disclosed which comprises: a support shaft which is rotated by a drive; a case body which is fixed to the support shaft and which rotates together with the support shaft; a ring magnet which is placed at the inside corner, in the radial direction, of an inner space of the case body; and a balancing member, where the balancing member further comprises a plurality of magnetic bodies which are movable in the inner space of the case body and which are drawn up by the magnetic field of the ring magnet; wherein, when the rotational frequency of a rotor, which rotates together with the case body, exceeds the resonant frequency, the automatic balancing apparatus reduces vibrations of the rotor; and the outer circumference of the ring magnet has a plurality of magnetized portions wherein the number of the magnetized portions is equal to or higher than the number of the balancing members.

DESCRIPTION OF THE INVENTION AND PREFERRED EMBODIMENTS

Figure 3:
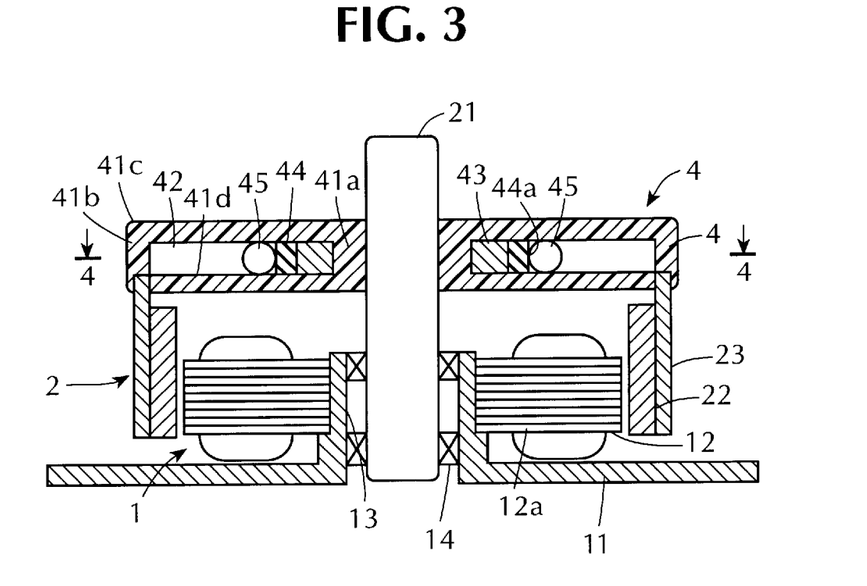
FIG. 3 is a vertical section of a spindle motor in which an automatic balancing apparatus of a first embodiment according to the present invention is integrated with a rotor.

FIG. 3 shows a spindle motor having an automatic balancing apparatus of the first embodiment of the present invention. This spindle motor is a part of a drive unit to rotate a disc-shaped recording medium such as a CD or a magneto-optical disc and functions as a drive to rotate the recording medium.

The spindle motor as a drive, as shown in FIG. 3, mainly is configured of stator 1 and rotor 2 formed of a rotating body which is rotated when stator 1 receives electricity.

Stator 1 is comprised of stator hub 11, which is fixed to a mechanical chassis (not shown in the figure), and stator member 12 which is fixed to stator hub 11. Stator hub 11 has hole 13 through which support shaft 21 as a rotational axis of rotor 2 passes. Inside hole 13 is bearing 14 which supports support shaft 21 as a part of rotor 2 to be rotatable.

Rotor 2 as a rotating body is configured of support shaft 21, which is supported by stator 1 to be rotatable, and cylindrical yoke 23 in which rotor magnet 22 is fixed thereto. Yoke 23 is fixed to a side wall of rotor 2 and automated balancing apparatus 4, to which support shaft 21 is firmly fitted at its center, is integrally formed together with rotor 2. Additionally, rotor 2 is configured such that support shaft 21 is inserted in hole 13 of stator 1 to be supported by bearing 14 while rotor magnet 22 is placed across from stator member 12.

Automatic balancing apparatus 4 of this embodiment, as a part of rotor 2, is fixed to support shaft 21 and rotates together with support shaft 21. Further, automated balancing apparatus 4 has a chucking portion (not show in the figure) to which a recording medium, such as a CD or a magneto-optical disc, is fixed wherein a disc as a recording medium is fixed on the top of automated balancing apparatus. As a result, the disc rotates together with automatic balancing apparatus 4 by drive of spindle motor 1. In addition, the chucking portion and the disc form a part of the rotating body.

With the spindle motor of the above configuration, when stator member 12 is magnetized as electricity flows through coil 12a of stator member 12, a magnetic field, which rotates the rotating body including rotor 2, is generated between stator 1 and rotor 2 such that the rotating body rotates. In this embodiment, when the rotational frequency of the rotating body including rotor 2 exceeds the resonant frequency (e.g. when the rotation reaches 2,000 to 3,000 rpm; see FIG. 8), automatic balancing apparatus 4 as a part of rotor 2 functions to reduce vibrations during high-speed rotations of the rotating body.

Figure 4:
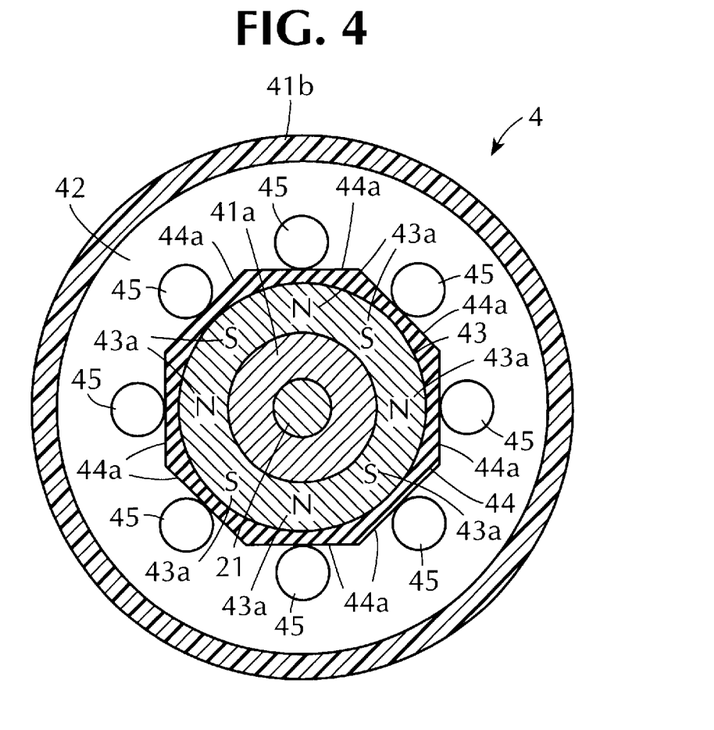
FIG. 4 is a cross section of the automatic balancing apparatus in FIG. 3 at II–II.

The following describes a first embodiment of the invention. Automatic balancing apparatus 4, as shown in FIGS. 3 and 4, is fixed around support shaft 21 at its rotational center such that it rotates as a part of rotor 2. Automatic balancing apparatus 4 also has: case body 41 having inner space 42 while being fixed around support shaft 21; ring magnet 43 which is placed at the inside corner, in the radial direction, of inner space 42 of case body 41; polygonal rubber 44 (octagonal in this embodiment; see FIG. 4) which is placed on the outer circumference of ring magnet 43; and a plurality of balls 45 as balancing members which are movable in inner space 42 on the outside of polygonal rubber 44.

With automatic balancing apparatus 4, balls 45 are drawn up by the magnetic power of ring magnet 43 such that they are being held at a given position (on flat portion 44a as discussed later) when the motor is at rest or when the rotation is just started. Therefore, at the beginning of the rotation, balls 45 are rotated together with support shaft 21 as a rotational axis of rotor 2.

When the rotational speed of rotor 2 increases and exceeds a given rotational frequency (the resonant frequency of the rotating body including rotor 2), the apparatus functions to reduce the vibrations of the rotating body. In other words, when the rotating body rotates at a speed at which the rotational frequency exceeds the resonant frequency, usually, large vibrations are generated at the rotational center (vibrations may occur at a rotational frequency below the resonant frequency, however, the vibrations are drastically amplified when the rotational frequency reaches the resonant frequency), causing rotational vibrations of the rotating body. In this automatic balancing apparatus 4, a plurality of balls 45 move from the given positions in inner space 42 in the direction away from the rotational center. As a result, the vibrations at the rotational center are reduced which, in turn, reduces the vibration of the rotating body.

The following describes a configuration of automatic balancing apparatus 4 of this first embodiment in detail. Case body 41 is formed of a nonmagnetic member, more specifically a plastic or the like, such that it is not affected by the magnetic power of ring magnet 43 therein. The outside of case body 41 is shaped as a disc while the inside has donut-shaped inner space 42 surrounding support shaft 21. In other words, case body 41 is configured of: shaft fixing portion 41a which is fixed to support shaft 21 at the rotational center; cylindrical wall portion 41b on the outer circumference; and first round plate portion 41c connecting the one side of shaft fixing portion 41a and wall portion 41b; and second round plate portion 41d which connects the other side of shaft fixing portion 41a and wall portion 41b. In addition, these parts are integrally formed while yoke 23 is sandwiched between wall portion 41b and second round plate portion 41d. Case body 41 of the above configuration rotates together with support shaft 21.

Ring magnet 43 (a magnet with a round edge in this embodiment) is fixed at the inside corner, in the radial direction, of inner space 42 of case body 41. The axial length of ring magnet 43 is approximately equal to the axial length of inner space 42 wherein ring magnet 43 is placed between round plate portions 41c and 41d. Ne—Fe—B sintered magnet, plastic magnet or rubber magnet can be used as ring magnet 43. The magnetic power of ring magnet 43 is adjusted such that balls 45 can move from a position close to ring magnet 43 to the outside of case 41 when the rotation of the rotating body reaches the resonant frequency, considering various conditions such as the mass of magnetic balls 45, the thickness of octagonal rubber 44, and the resonant frequency of the rotating body.

Figure 5:
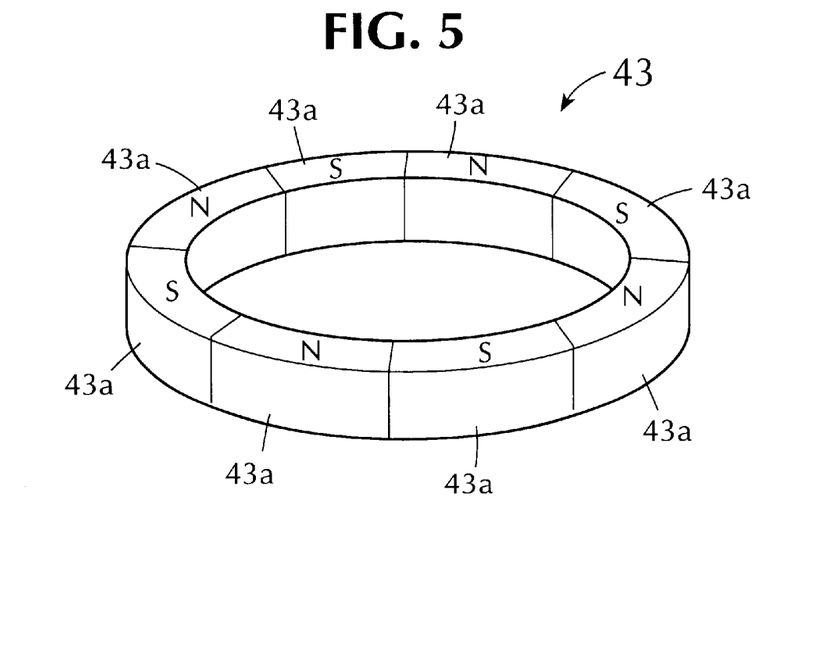
FIG. 5 is an oblique view of a ring magnet of the automatic balancing apparatus in FIG. 3.

As shown in FIGS. 4 and 5, eight magnetized portions 43a are formed on ring magnet 43 in the circumferential direction wherein the number, 8, is equal to the number of balls 45. These magnetized portions 43a have N poles and S poles alternatively which are equally distanced. In addition, the center of magnetized portions 43a corresponds to the center of flat portions 44a (discussed later). Hence, balls 45 are held on the outside of eight magnetized portions 43a at a equal distance from each other when rotor 2 is at rest and at the beginning of rotation. As a result, one can prevent rotational unbalance of rotor 2 at the beginning of rotation due to balls 45 being held off-center of the outside of ring magnet 43.

The outside of ring magnet 43 is surrounded by polygonal (octagonal) rubber 44 made of a magnetic member. Polygonal rubber 44 prevents balls 45 from directly colliding with ring magnet 43 while functioning as a shock absorbing member at the time of collision. When the rotational body is at rest, therefore, rubber 44 prevents colliding sounds when hard balls 45 collide with ring magnet 43 and damage of ring magnet 43 and balls 45.

The inner circumference of polygonal rubber 44 is formed as a circle such that it contacts the outer circumference of ring magnet 43 while the outer circumference has eight flat portions 44a wherein the number, 8, is equal to the number of balls 45 and the number of poles on ring magnet 43 (the number of magnetized portions 43a). Ball 45 is held on each of flat portions 44a when rotor 2 is at rest and at the beginning of rotation.

According to the present invention, balls 45 are held on flat portions 44a when rotor 2 is at rest. Therefore, compared to a conventional configuration in which balls are held on the outer circumference of a cylindrical magnet, holding force to the balls in the tangential direction is stronger. As a result, the holding force to the balls is strong at the beginning of rotation such that balls 45 do not shift around ring magnet 43, resulting in prevention of the colliding sounds among balls 45 and damages thereof. In addition, the strong holding force prevents amplification of rotational vibrations at the beginning of rotation caused by shifting of balls 45 in the circumferential direction.

In this embodiment, the shock absorbing member is formed of polygonal rubber 44 surrounding support shaft 21 with flat portions 44a. However, as long as the number of the flat portions is equal to the number of balls 45, it does not have to be a regular polygon. Nonetheless, the rotational balance improves as the areas of flat portions 44a become equal such that the holding force thereof evens out, which is the reason why this embodiment employs the regular polygon. Additionally, polygon rubber 44 is octagonal in this embodiment. However, the number of flat portions 44a is not limited to 8; other polygons are applicable.

The axial length of polygon rubber 44 is approximately equal to the axial length of inner space 42, similar to ring magnet 43 wherein round plate portions 41c and 41d sandwich polygonal rubber 44. In this embodiment, polygonal rubber 44 formed of a non-magnetic member is placed between ring magnet 43 and balls 45 as a shock absorbing member. However, the shock absorbing member can be a magnetic member formed of a material identical to ring magnet 43. In the case of polygonal rubber 44 formed of a magnetic member, it can be magnetized in a similar manner with ring magnet 43, or it can be left without magnetization.

A space outside polygonal rubber 44, that is a space enclosed by polygonal rubber 44, wall portion 41b and round plate portions 41c and 41d of case body 41, contains a plurality, specifically 8 herein, of balls 45 made of a magnetic metal member which are movable in the circumferential and radial directions. Balls 45 are drawn up to ring magnet 4 by the magnetic power such that they are fixed on flat portions 44a of polygonal rubber 44.

When the rotational frequency of the rotating body exceeds the resonant frequency as the rotational speed of rotor 2 increases, balls 45 shift to the outside in the radial direction in inner space 42, away from flat portions 44a on the outside of ring magnet 43, that is toward wall portion 41b. As a result, balls 45 become movable in the circumferential direction on the side of wall portion 41b. When large vibrations are generated at the rotational center as the rotational frequency of the rotating body exceeds the resonant frequency, balls 45 shift along wall portion 41b in the direction opposite from the direction to which the rotational center is tilt. Consequently, the rotational center returns to the original center position by the shifting of the plurality of balls 45. By continuing this operation, the rotating body can rotate with reduced vibrations.

The above is one of preferable embodiments of the present invention. However, one is not limited to the above, and various modifications are applicable within the scope of the present invention. For example, the above embodiment showed a drive unit which controls the rotation of a disc-shaped recording medium, such as a CD and a magneto-optical disc. However, the present invention is not limited to an apparatus to control the rotation of a recording medium, such as a CD, but is applicable to any apparatus which controls the rotation of a rotating body at a high speed exceeding the resonant frequency.

In the above embodiment, moreover, automatic balancing apparatus 4 is a part of rotor 2. However, automatic balancing apparatus 4 can be configured separate from the rotor and independently fixed to support shaft 21, as in the conventional rotation control apparatus of FIG. 1.

In addition, according to the above embodiment, ring magnet 43 has magnetized portions 43a whose number is equal to the number of balls 45, as well as forming the same number of flat portions 44a around polygonal rubber 44, in order to firmly hold balls 45 around ring magnet 43 at the beginning of the rotation of rotor 2. However, these configurations, magnetized portions 43a and flat portions 44a are independently effective such that only one can be employed. In other words, one may employ only the flat portions whose number is equal to the number of balls 45, or the magnetic poles whose number is equal to the number of balls 45.

Also, the number of flat portions can be one or two less or more than the number of balls 45, instead of the equal number. Additionally, even one flat portion 44a can prevent the aggregation of balls 45, compared to when no flat portions 44 are formed. The number of magnetized portions 43a can be established to be higher than the number of balls 45.

Further, polygonal rubber 44 is positioned on the outside of ring magnet 43 as a shock absorbing member to prevent direct collision between balls 45 and ring magnet 44 in the above embodiment. However, the shock absorbing member can be omitted. In such a case, the shape of ring magnet 43, instead of a circular shape, can be a regular polygon having flat portions whose number is equal to the number of balls 45, or simply a polygon having flat portions (not a regular polygon). In addition, ring magnet 43 can be just a circular magnet, without having flat portions on its circumference, but having magnetized portions whose number is equal to the number of balls 45. Round ring magnet 43, with a rubber member of a regular polygon in the above embodiment, is easier to form compared to a polygonal magnet.

The above embodiment has balls 45 as balancing members. However, the balancing members can be any shape, such as a cylinder or a barrel, as long as they are movable with the magnetic power and the centrifugal force in inner space 42 of case body 41. Additionally, the surface of the balancing members, on which they collide with the wall of ring magnet 43 at the inside corner of inner space 42 by being drawn up by the magnetic power, can be formed as a concavity instead of a convexity of balls 45.

The following describes a second embodiment of the invention. Any configurations of the second embodiment common with first embodiment described above are indicated with identical symbols and descriptions thereof are omitted.

Figure 6:
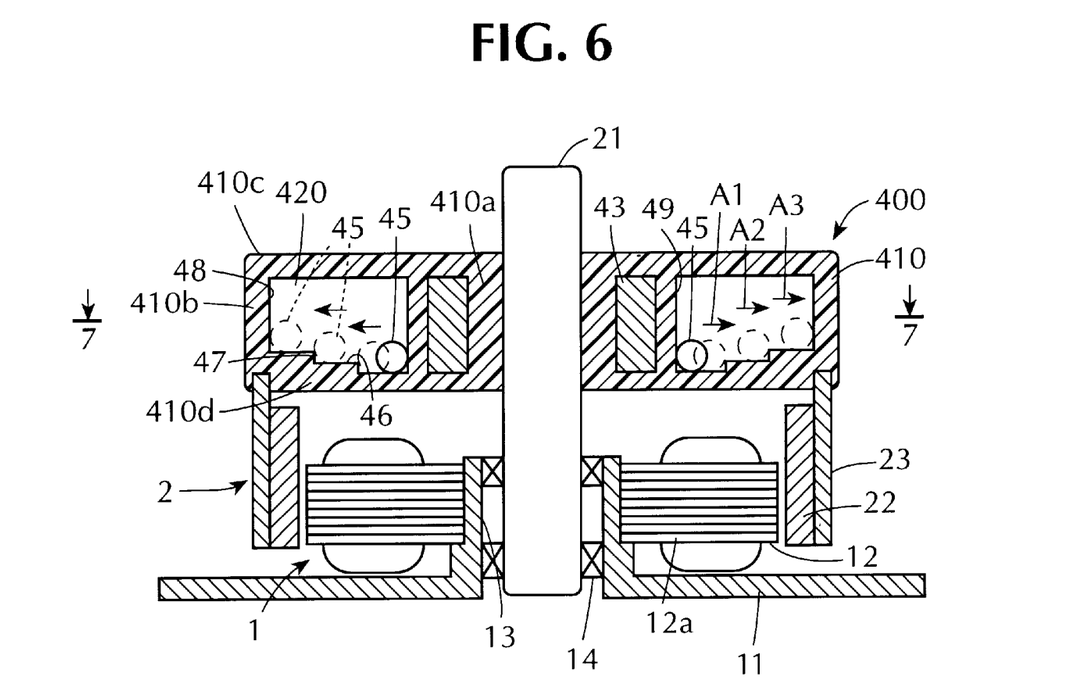
FIG. 6 is a vertical section of a spindle motor in which an automatic balancing apparatus of a second embodiment according to the present invention is integrated with a rotor.
Figure 7:
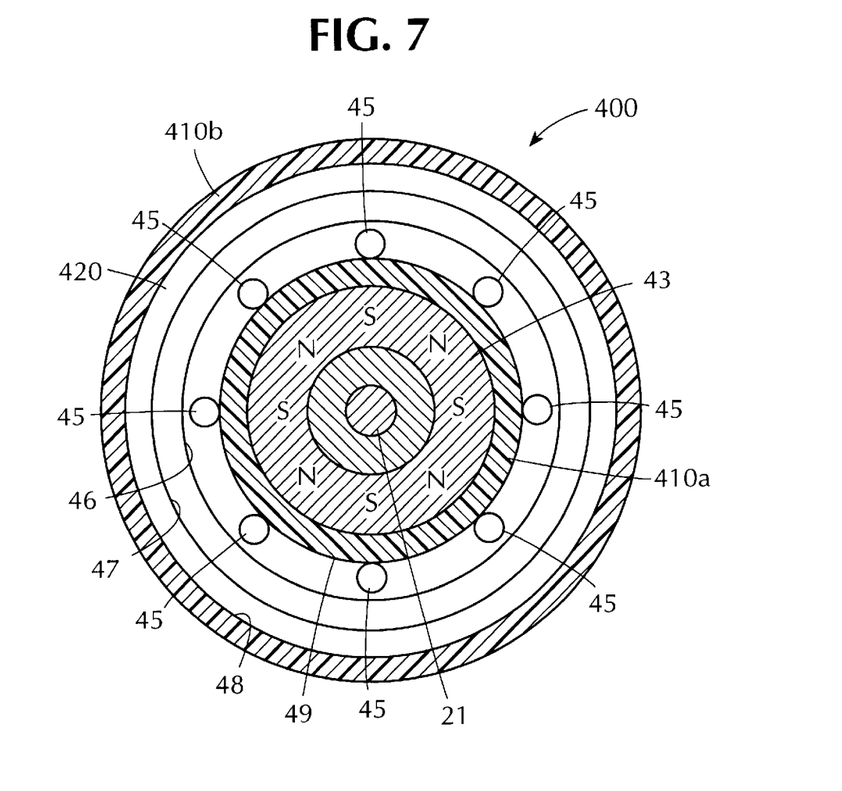
FIG. 7 is a cross section of the automatic balancing apparatus in FIG. 6 at II–II.

Automatic balancing apparatus 400, as shown in FIGS. 6 and 7, is fixed around support shaft 21 at its rotational center such that it rotates as a part of rotor 2. Automatic balancing apparatus 400 also has: case body 410 having inner space 420 while being fixed around support shaft 21; ring magnet 43 which is embedded in the inside corner, in the radial direction, of inner space 420 of case body 410; and a plurality of magnetic balls 45 as balancing members which are movable in inner space 420.

In automatic balancing apparatus 400, balls 45 are drawn up by the magnetic force of ring magnet 43 such that they do not shift to the outside in the radial direction when the rotational body is at rest or at the beginning of the rotation. In other words, ring magnet 43 functions as a portion to hold balls 45 when the rotating body is at rest or at the beginning of the rotation. Therefore, at the beginning of the rotation, balls 45 rotate together with support shaft 21 as the rotational axis of the rotating body.

When the rotational speed increases and exceeds the resonant frequency, the apparatus functions to prevent vibrations of the rotating body. In other words, when the rotating body rotates at a speed at which the rotational frequency exceeds the resonant frequency, usually, large vibrations are generated at the rotational center (vibrations may occur at a rotational frequency below the resonant frequency, however, the vibrations are drastically amplified when the rotational frequency reaches the resonant frequency), causing rotational vibrations of the rotating body. In this automatic balancing apparatus 400, a plurality of balls 45 move outward against the force of ring magnet 43 to hold balls 45 at the same position. As a result, the rotational vibrations are reduced by a first operating portion (equivalent of first step 46) as discussed later.

When the rotational speed further increases such that the rotational speed exceeds a given rotational frequency (about 7,000 rpm in this embodiment: see FIG. 8) causing amplified vibrations, a plurality of balls 45 shift from the first operating portion to a second operating portion (equivalent of second step 47) as discussed later such that the rotational vibrations are reduced thereat.

In this embodiment, a plurality of, more specifically two of, the second operating portions are formed at different positions in the radial direction (second step 47 and outermost wall portion 48 as discussed later). If the rotational speed further increases and exceeds a given rotational frequency (about 10,000 rpm in this embodiment: see FIG. 8) while balls 45 shift in the circumferential direction at second step 47, formed inside in the radial direction, to decrease the rotational vibrations, balls 45 shift to outermost wall portion 48, which is positioned outward from second step 47 in the radial direction, such that the rotational vibrations are reduced thereat.

The following describes a detailed configuration of automatic balancing apparatus 400.

Case body 410 is formed of a non-magnetic member, more specifically a plastic or the like, such that it is not affected by the magnetic power of ring magnet 43 therein. The outside of case body 410 is shaped as a disc while the inside has donut-shaped inner space 420 surrounding support shaft 21. In other words, case body 410 is configured of: shaft fixing (center portion) 410a which is fixed to support shaft 21 at the rotational center; cylindrical wall portion 410b on the outer circumference; and first round plate portion 410c connecting the one side of shaft fixing (center portion) 410a and wall portion 410b; and second round plate portion 410d which connects the other side of shaft fixing (center portion) 410a and wall portion 410b and which have a plurality of steps 46 and 47. In addition, these parts are integrally formed, and case body 41 of the above configuration rotates together with support shaft 21.

Round ring magnet 43 is embedded at shaft fixing (center portion) 410a of case body 410 at center portion of case body 410 around the shaft. Ring magnet 43 holds balls 45 with its magnetic power when the rotating body is at rest or at the beginning of rotation, such that balls 45 are prevented from moving outward in the radial direction. In addition, ring magnet 43 draws up balls 45 inward in the radial direction in inner space with its magnetic power when the rotational speed is reduced.

A Ne—Fe—B sintered magnet, plastic magnet or a rubber magnet can be used as ring magnet 43. The magnetic power of ring magnet 43 is adjusted such that balls 45 can move from a position close to ring magnet 43 to the outside of case 410 when the rotation of the rotating body reaches the resonant frequency, considering various conditions such as the mass of magnetic balls 45, the thickness of octagonal rubber 44, and the resonant frequency of the rotating body.

The bottom surface of inner space 420, which is configured of second round plate portion 410d, has first step 46 and second step 47. First step 46 and second step 47 are formed in a circular shape along the radius of the bottom surface.

First step 46 is positioned outside of innermost wall portion 49 of inner space 420 in case body 410 in the radial direction wherein the position is outward from the position of balls 45 to be held by ring magnet 43 when the rotating body is at rest or at the beginning of rotation. First step 46 prevents balls 45 from shifting further outward in the radial direction when the rotating frequency of the rotating body exceeds the resonant frequency (indicated with arrow A1 in FIG. 6) such that first step 46, as a first operating portion, affects balls 45 to reduce vibrations of the rotating body at the speed exceeding the resonant frequency.

In other words, when the rotating frequency of the rotating body exceeds the resonant frequency (it is established such that the resonant frequency is reached when the rotation of the rotating body exceeds about 2,000 to 3,000 rpm), balls 45 start shifting outward in the radial direction by the centrifugal force, against the magnetic force of ring magnet 43 to hold balls 45 at the same position. First step 46 prevents balls 45 from shifting outward in the radial direction with its inner wall while allowing the movement of balls 45 in the circumferential direction. Therefore, when the rotation of the rotating body exceeds the resonant frequency, balls 45 shift in the circumferential direction at first step 46, away from the rotational center of the rotating body.

Figure 8:
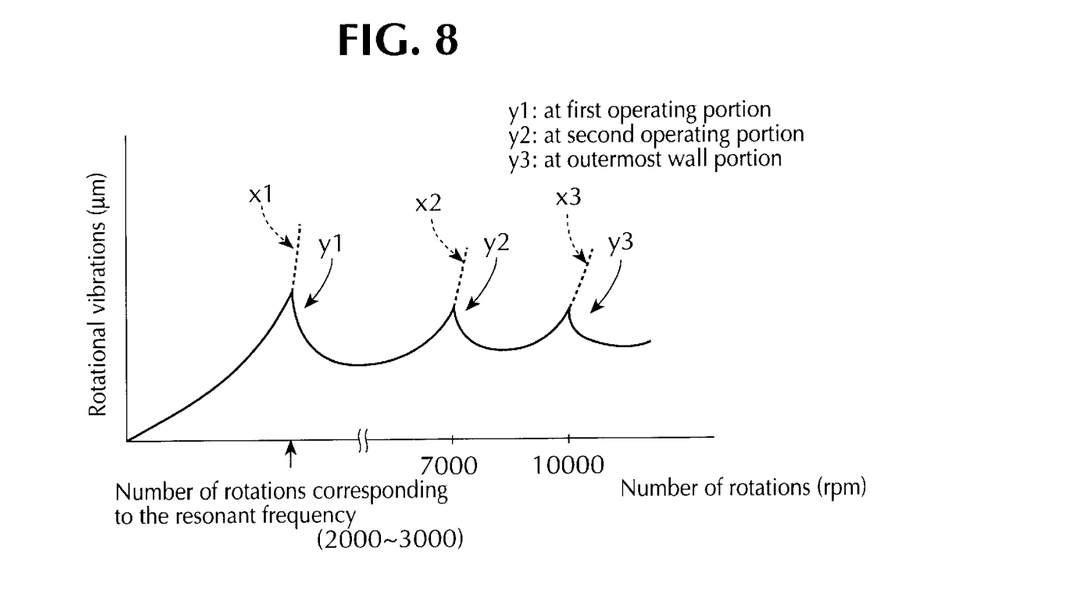
FIG. 8 is a graph indicating the relationship between the rotational vibrations and the number of rotations when the automatic balancing apparatus of the second embodiment is employed.

Normally, the rotational center dramatically shifts such that the rotational vibrations increase when the rotation exceeds the resonant frequency as indicated with a dotted line (arrow x1) in FIG. 8. However, as a result of the above phenomena, the rotational vibrations due to the shift of the center are canceled out by the shift of balls 45, as indicated with the solid line (arrow y1) in FIG. 8. Hence, the rotating body can rotate without the rotational vibrations.

The height of first step 46 (in the axial direction of support shaft 21) is established to be slightly smaller than radius r of balls 45. Additionally, first step 46 has a slant of 88 degree in relation to the horizontal surface of case body 410 which is fixed perpendicularly to shaft 21. The distance between first step 46 and the rotational center, and the height and the slant angle of first step 46 are established such that balls 45 run over first step 46 and shift further outward when the rotation of the rotating body exceeds a given frequency beyond the resonant frequency (about 6,000 to 7,000 rpm). Hence, balls 45 shift further outward when the rotation of the rotating body exceeds 7,000 rpm.

Second step 47 is positioned outward in the radial direction from first step 46. Second step 47 prevents balls 45 from further shifting outward after running over first step 46 as the first operating portion such that second step as a second operating portion affects balls 45 to reduce the vibrations of the rotating body which rotates over 7,000 rpm.

In other words, when the rotational frequency of the rotating body exceeds the given frequency beyond the resonant frequency (the frequency corresponding the rotation of the rotating body exceeding 7,000 rpm), balls 45 run over first step 46 and move outward in the radial direction by centrifugal force (indicated with arrow A2 in FIG. 6). Second step 47 prevents balls 45 from shifting outward with its inner wall while allowing the shift in the circumferential direction. Hence, balls 45 can move in the circumferential direction at second step 47, away from the rotational center of the rotating body, when the rotational vibrations are amplified as the rotational speed increases after reducing the rotational vibrations by shifting balls 45 in the circumferential direction at first step 46.

If second step 47 does not function as described above, the rotational vibrations would amplify due to the shift of the rotational center beyond about 7,000 rpm, as indicated with a dotted line (arrow x2) in FIG. 8. However, as a result of the above phenomena, the rotational vibrations due to the shift of the center are canceled out by the shift of balls 45, as indicated with the solid line (arrow y2) in FIG. 8. Hence, the rotating body can rotate without the rotational vibrations.

The height of second step 47 (in the axial direction of support shaft 21) is established to be slightly lower than radius r of balls 45 and slightly higher than first step 46. Additionally, second step 47 has a slant of 89 degrees in relation to the horizontal surface of case body 410 which is fixed perpendicularly to support shaft 21. In other words, the slant angle of second step 47 is slightly steeper than the slant of the fist step. Second step 47 is formed higher and steeper than first step 46, which is positioned inward from second step 47, such that it can prevent balls 45 from jumping out by corresponding to an increase in the speed as the position of balls 45 move outward.

The distance between second step 47 and the rotational center, and the height and the slant angle of second step 47 are established such that, similar to first step 46, balls 45 run over second step 47 and shift further outward when the rotation of the rotating body exceeds a given frequency beyond the resonant frequency (about 10,000 rpm). Hence, balls 45 shift further outward when the rotation of the rotating body exceeds 10,000 rpm.

Outermost wall portion 48 of inner space 420 is formed of the inner wall of wall portion 410b of case body 410 and functions as one of second operating portions outside of second step 47. In other words, outermost wall portion 48 prevents balls 45 from further shifting outward after running over second step 47 as the second operating portion such that balls 45 reduces vibrations of the rotating body which rotates over 10,000 rpm.

In other words, when the rotation of the rotating body exceeds 10,000 rpm, balls 45 run over second step 47 and move outward with the centrifugal force (indicated with arrow A3 in FIG. 6). Outermost wall portion 48 prevents balls 45 from shifting outward in the radial direction while allowing the shifting in the circumferential direction. Therefore, balls 45 shift in the circumferential direction at outermost wall portion 48, away from the rotational center of the rotating body, when the rotational vibrations are amplified due to a further increase in the rotational speed after the rotational vibrations are reduced by shifting balls 45 in the circumferential direction at second step 47.

If outermost wall portion 48 does not function as described above, the rotational vibrations would amplify due to the shift of the rotational center beyond about 10,000 rpm, as indicated with a dotted line (arrow x3) in FIG. 8. However, as a result of the above phenomena, the rotational vibrations due to the shift of the center are canceled out by the shift of balls 45, as indicated with the solid line (arrow y3) in FIG. 8. Hence, the rotating body can rotate without the rotational vibrations.

In this embodiment, areas between first step 46 and innermost wall portion of inner space 420 at the bottom, between steps 46 and 47, and between second step 47 and outermost wall portion 48 of inner space 420 are separately formed with a slant which raises as it goes outward in the radial direction of case body 410. This configuration allows balls 45, which shifted outward in inner space 420, to smoothly return inward when the rotational speed of the rotating body slows down.

According to this embodiment, balls 45 shift from outermost wall portion 48 to second step 47 when the rotation slows down from 10,000 rpm. As a result, balls 45 shift in the circumferential direction while contacting the inner wall of second step 47. In addition, when the rotation slows down from 7,000 rpm, balls 45 shift from second step 47 to first step 46 and move in the circumferential direction while contacting the inner wall of first step 46. In other words, this embodiment allows balls to constantly move smoothly. As a result, balls 45 shift in the direction in which the rotational center of the rotating body staggers such that one can prevent colliding sound caused when balls 45 collide with each other.

This embodiment has a configuration with slanted surfaces. However, the bottom areas between the steps can be formed as flat surfaces perpendicular to support shaft 21. In such a case, balls 45 return inward only by the magnetic power of ring magnet 43.

Balls 45 move away from innermost wall portion 49 outside ring magnet and shift outward in the radial direction in inner space 420 when the rotational speed of the rotating body increases such that the rotational frequency exceeds the resonant frequency. Therein, first step 46 prevents balls 45 from further shifting outward while balls 45 become movable in the circumferential direction thereat. Therefore, when large vibrations occur at the rotational center as the rotational frequency of the rotating body exceeds the resonant frequency, a plurality of balls 45 shift along the inner wall of first step 46 in the direction opposite from the direction to which the rotational center is slanted. As a result, the rotational center moves back to the original center position by the shift of balls 45. By constantly repeating the above operation, the rotating body can rotate with reduced vibrations.

When the rotational speed of the rotating body further increases such that the rotational frequency exceeds a given value (the rotational frequency corresponding to 7,000 rpm), balls 45 run over first step 46 and shift further outward in the radial direction in inner space 420. Second step 47 prevents balls 45 from further shifting outward while balls 45 become movable in the circumferential direction thereat. Therefore, when large vibrations occur at the rotational center as the rotational frequency of the rotating body exceeds the given value, a plurality of balls 45 shift along the inner wall of second step 47 in the direction opposite from the direction to which the rotational center is slanted. As a result, the rotational center moves back to the original center position by the shift of balls 45. By constantly repeating the above operation, the rotating body can rotate with reduced vibrations.

When the rotational speed of the rotating body further increases such that the rotational frequency exceeds a given value (the rotational frequency corresponding to 10,000 rpm), balls 45 run over second step 46 and shifts further outward in the radial direction in inner space 420. Outermost wall portion 48 prevents balls 45 from further shifting outward while balls 45 become movable in the circumferential direction thereat. Therefore, when large vibrations occur at the rotational center as the rotational frequency of the rotating body exceeds the given value, a plurality of balls 45 shift along the inner wall of outermost wall portion 48 in the direction opposite from the direction to which the rotational center is slanted. As a result, the rotational center moves back to the original center position by the shift of balls 45. By constantly repeating the above operation, the rotating body can rotate with reduced vibrations.

The above embodiment is one of several preferable embodiments of the present invention. However, various modifications are applicable within the scope of the present invention. For example, the above embodiment showed an example of a drive unit to rotate a disc-shaped recording medium such as a CD and a magnet-optical disc. However, the present invention is not limited to an apparatus which rotates a recording medium, but is also applicable to any apparatus which rotates a rotating body at a high speed exceeding the resonant frequency.

In the above embodiment, automatic balancing apparatus 400 is configured as a part of rotor 2. However, automatic balancing apparatus 400 can be formed separate from the rotor and individually fixed to support shaft 21, similar to the conventional rotation control apparatus shown in FIG. 1.

In the above embodiment, in addition, inner space 420 of nonmagnetic case body 410 has two steps 46 and 47 at its bottom formed of second round plate portion 410d wherein first step 46 is a first operating portion and second step portion 47 and outermost wall portion 48 are second operating portions. However, one may increase the number of the second operating portions by forming additional steps, or one may form only one step while using only outermost wall portion 48 as a second operating portion.

Figure 9:
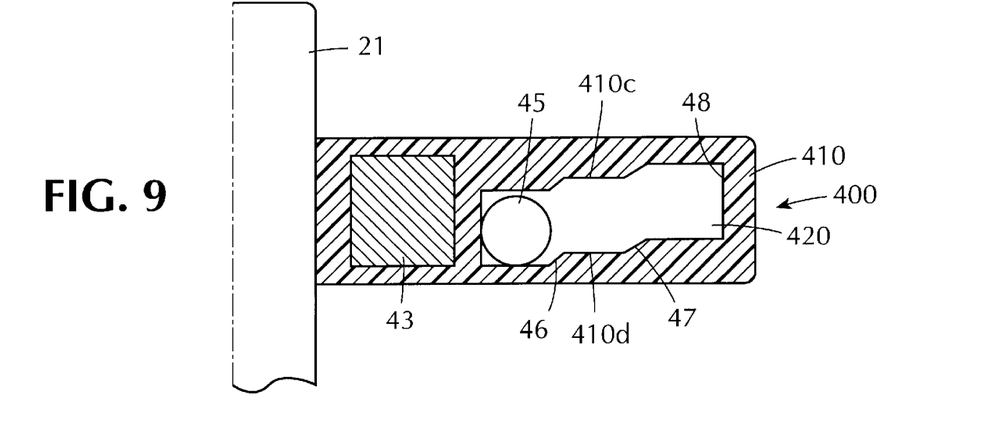
FIG. 9 is a half of a cross section indicating a first modification with the automatic balancing apparatus of the second embodiment of the present invention.

Further, inner space 420 can have steps on the ceiling formed of first round plate portion 410c as shown in FIG. 9. This configuration provides better weight balance between the inside and the outside of case body 410 such that the balance in rotations is stabilized.

Figure 10:
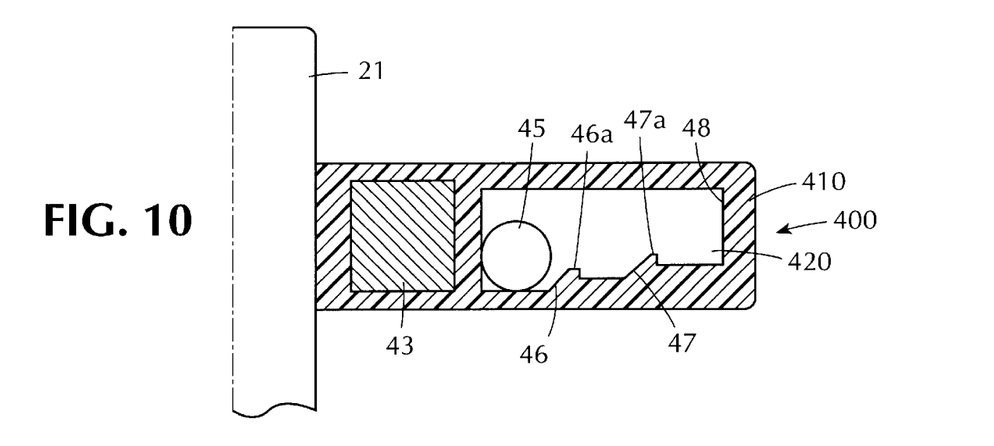
FIG. 10 is a half of a cross section indicating a second modification with the automatic balancing apparatus of the second embodiment of the invention.

As shown in FIG. 10, steps 46 and 47 may have jetties (or lips) 46a and 47a. This configuration prevents balls 45 from running over steps 46 and 47 while colliding therewith due to the centrifugal force when balls 45 are moving from the outer circumference of ring magnet 43 to first step 46 and when balls 45 are moving from first step 46 to second step 47.

Figure 11:
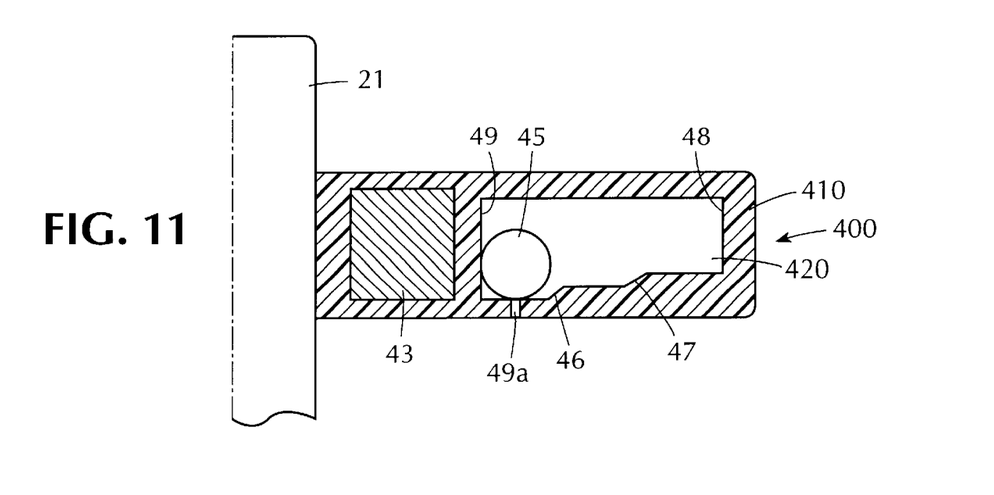
FIG. 11 is a half of a cross section indicating a third modification with the automatic balancing apparatus of the second embodiment of the present invention.

As shown in FIG. 11, one may form ring hole 49a at the position where balls 45 are held when rotor 2 is at rest or at the beginning of the rotation, that is in the vicinity of the outer circumference of ring magnet 43. This configuration stabilizes balls 45 thereat.

Moreover, in the above embodiment, ring magnet 43 is embedded at the shaft fixing (center portion) 410a of in case body 410 wherein ring magnet 43 is to hold balls 45 when the rotating body is at rest or at the beginning of the rotation. However, one may omit embedded ring magnet 43 and provide a different means to hold balls 45 thereat. In such a case, it is not necessary to form balls 45 of a magnetic member.

For example, first step 46 may be designated as the portion to hold balls 45 by positioning it closer to shaft fixing (center portion) 410a compared to the configuration of the above embodiment such that the distance between first step 46 and shaft fixing (center portion) 410a in the radial direction may be established to be approximately equal to the diameter of balls 45. In such a case, second step 47 outside of first step 46 may be used as a first operating portion while outermost wall portion 48, positioned outside of second step 47, is used as a second operating portion.

Additionally, a ring groove can be formed on the bottom of case body 410 between first step 46 and shaft fixing (center portion) 410a such that the groove may be used as a portion to hold balls 45 when the rotating body is at rest or at the beginning of the rotation.

Balls 45 are held by the magnetic power of ring magnet 43 at the beginning of the rotation of the rotating body in the above embodiment. Therefore, balls 45 may shift along innermost wall portion 49 in the circumferential direction due to the centrifugal force at the beginning of the rotation. This causes colliding sound, when balls 45 collide with each other, or balls 45 may be held around ring magnet 43 while bunching up at one position when the rotation stops. The following configuration may prevent balls 45 from shifting in the circumferential direction at the beginning of the rotation.

For example, radial grooves may be formed at the bottom of case body 41 or 410 between first step 46 and shaft fixing (center portion) 41a or 410a such that balls 45 are fixed in the grooves to prevent the shift of balls 45 in the circumferential direction. Additionally, radial partition walls may be formed at innermost wall portion 49 of case body 41 or 410 such that the shift of balls 45 in the circumferential direction can be prevented. Further, a shock-absorbing member of the first embodiment 1 can be applied to automatic balancing apparatus 410 of the second embodiment.

As described above, the automatic balancing apparatus of the present invention is configured such that flat portions are formed on the outer circumference of the ring magnet in the case body which rotates together with the support shaft. Therefore, the magnetic balancing members are held on the flat portions, instead of bunching up at one position when the rotations are suspended. Consequently, one may prevent a phenomena of amplified rotational vibrations due to the deviated center. Further, the balancing members are held on the flat portions, instead of being held on the outer circumference of a cylindrical member as in conventional technology, such that one may prevent the shift of the balancing members in the circumferential direction at the beginning of the rotation. Therefore, one may prevent the rotational vibrations due to the shift of the balancing members and collision among the balancing members.

Another automatic balancing apparatus of the present invention has magnetized portions, whose number is equal to or more than the number of the balancing members, on the outer circumference of the ring magnet in the case body, which rotates together with the support shaft, such that the balancing members are held by the magnetized portions. Hence, the balancing members, formed of a magnetic body, can be separately held on each of magnetized portions, instead of bunching up at one position when the rotation is suspended. As a result, one may prevent amplification of the rotational vibrations due to the deviated center at the beginning of the rotation. In addition, one may prevent the shift of the balancing members in the circumferential direction at the beginning of the rotation. Therefore, one may prevent the rotational vibrations due to the shift of the balancing members and collision among the balancing members.

The automatic balancing apparatus of the present invention has a plurality of balancer members which are movable in the inner space of the case body which rotates together with the support shaft. These balancer members are held at designated portions when the rotating body is at rest or at the beginning of the rotation. Additionally, the apparatus has the first operating portion, which affects on the balancer members to reduce the vibrations of the rotating body when the balancer members shift outward as the rotational frequency of the rotating body exceeds the resonant frequency, and the second operating portion which affects the balancer members to reduce the vibrations of the rotating body when the rotation further speeds up.

When the rotational frequency of the rotating body exceeds the resonant frequency, the balancer members first shift from the original position, to hold the balancer members at the time of suspended rotation or the beginning or the rotation, to the first operating portion such that the rotational vibrations are reduced by reducing the vibrations of the rotating body. When the rotating body further speeds up, the balancer members then shift from the first operating portion to the second operating portion to reduce the rotational vibrations of the rotating body at high speed. Therefore, the rotational vibrations of the rotating body can be reduced corresponding to a wide range of the rotational speed exceeding the resonant frequency. In addition, the amplification of the rotational vibrations at low speed can be reduced by establishing the resonant frequency of the rotating body to be rather low.

Those of ordinary skill in the art will recognize that many modifications and variations of the present invention may be implemented. The foregoing description and the following claims are intended to cover all such modifications and variations.

What is claimed is:

1. An automatic balancing apparatus comprising:
   a support shaft which is rotated by a drive;
   a case body which is fixed to said support shaft and which rotates together with said support shaft;
   a ring magnet which is placed at the inside corner, in the radial direction, of an inner space of said case body; and
   a balancing member, said balancing member further comprising a plurality of magnetic bodies which are movable in said inner space of said case body and which can be drawn up by the magnetic field of said ring magnet;
   wherein, when the rotational frequency of a rotor, which rotates together with said case body, exceeds the resonant frequency, said automatic balancing apparatus reduces vibrations of said rotor, and the outer circumference of said ring magnet has a flat portion.

2. The automatic balancing apparatus according to claim 1 in which the outer circumference of said ring magnet has a plurality of said flat portions wherein the number of said flat portions is equal to the number of said balancing member.

3. An automatic balancing apparatus comprising:
   a support shaft which is rotated by a drive;
   a case body which is fixed to said support shaft and which rotates together with said support shaft;
   a ring magnet which is placed at the inside corner, in the radial direction, of an inner space of said case body; and
   a balancing member, said balancing member further comprising a plurality of magnetic bodies which are movable in said inner space of said case body and which can be drawn up by the magnetic field of said ring magnet;
   wherein, when the rotational frequency of a rotor, which rotates together with said case body, exceeds the resonant frequency, said automatic balancing apparatus reduces vibrations of said rotor, and the outer circumference of said ring magnet has a number of magnetized portions wherein the number of said magnetized portions is equal to or higher than the number of said balancing member.

4. The automatic balancing apparatus according to claim 1 wherein:
   a shock absorbing member is placed on the outer circumference of said ring magnet to prevent said balancing member from directly colliding with said ring magnet and to reduce the impact of the collision of said balancing member;
   the outer circumference of said shock absorbing member has a flat portion; and
   a magnetized portion is formed in the radial direction on said ring magnet corresponding to said flat portion.

5. The automatic balancing apparatus according to claim 4 in which said shock absorbing member is made of a magnetic member.

6. The automatic balancing apparatus according to claim 1 in which the outer circumference of said ring magnet has a part shaped as a regular polygon which surrounds said support shaft.

7. An automatic balancing apparatus comprising:
   a support shaft which is rotated by a drive;
   a case body which is fixed to said support shaft and which rotates together with said support shaft; and
   a plurality of balancer members which are movable in a inner space of said case body;
   wherein, when the rotational frequency of a rotor, which rotates together with said case body, exceeds the resonant frequency, said automatic balancing apparatus (1) reduces vibrations of said rotor; and (2) the inside of said case body has (i) a holding portion which prevents said plurality of balancer portions from moving outward in the radial direction when said rotor is at rest and at the beginning of the rotation of said rotor; (ii) a first operating portion which reduces vibrations of said rotor by preventing said plurality of balancer members from further shifting outward in the radial direction when the shift of said balancer members occurs with the holding force of said holding portion as the rotational frequency of said rotor exceeds the resonant frequency; and (iii) a second operating portion which reduces vibrations of said rotor, rotating at a rotational frequency exceeding a given value, by preventing said balancer members from further shifting outward in the radial direction beyond said first operating portion when the rotational frequency of said rotor exceeds said given value which is beyond the resonant frequency.

8. The automatic balancing apparatus according to claim 7 wherein:
   a plurality of said second operating portion is formed at various positions in the radial direction; and
   when said plurality of balancer members shifts outward in the radial direction exceeding said second operating portion which is positioned toward the inside in the radial direction, another second operating portion, positioned toward the outside in the radial direction, prevents further outward shift.

9. The automatic balancing apparatus according to claim 7 wherein said balancer member is formed of a magnetic body while said holding portion is formed of a ring magnet positioned at the inside corner, in the radial direction, of said inner space of said case body.

10. The automatic balancing apparatus according to claim 7 wherein said holding portion is formed of steps on a side of the inside of said case body on which said plurality of balancer members run.

11. The automatic balancing apparatus according to claim 7 wherein said holding portion is formed of grooves at the inside corner, in the radial direction, of said inner space and on one side of the inside of said case body.

12. The automatic balancing apparatus according to claim 7 wherein said holding member has a preventing means which prevents the shift of balancer members in the circumferential direction.

13. The automatic balancing apparatus according to claim 7 wherein at least one of said first and second operating members is formed of steps on one side of the inside of said case body on which said plurality of balancer members run.

14. The automatic balancing apparatus according to claim 13 wherein the height of said steps forming said first and second operating portions is established to be larger for ones positioned on the outside in the radial direction of said case body.

15. The automatic balancing apparatus according to claim 13 wherein the angle of each of said steps forming said first and second operating portions is established to be steeper for the one positioned on the outside in the radial direction of said case body.

16. The automatic balancing apparatus according to claim 12 wherein the area between steps is formed of a slope which becomes steeper for ones positioned on the outside in the radial direction of said case body.

17. An automatic balancing apparatus comprising:

a support shaft which is rotated by a drive;

a case body which is fixed to said support shaft and which rotates together with said support shaft;

a ring magnet which is placed at the inside corner, in the radial direction, of an inner space of said case body; and a balancing member, said balancing member further comprising a plurality of magnetic bodies which are movable in said inner space of said case body and which are drawn up by the magnetic field of said ring magnet;

wherein, when the rotational frequency of a rotor, which rotates together with said case body, exceeds the resonant frequency, said automatic balancing apparatus reduces vibrations of said rotor; and the outer circumference of said ring magnet has a flat portion.

18. The automatic balancing apparatus according to claim 1 wherein the outer circumference of said ring magnet has a plurality of said flat portions wherein the number of said flat portions is equal to the number of said balancing members.

19. An automatic balancing apparatus comprising:

a support shaft which is rotated by a drive;

a case body which is fixed to said support shaft and which rotates together with said support shaft;

a ring magnet which is placed at the inside corner, in the radial direction, of an inner space of said case body; and a balancing member, said balancing member further comprising a plurality of magnetic bodies which are movable in said inner space of said case body and which are drawn up by the magnetic field of said ring magnet;

wherein, when the rotational frequency of a rotor, which rotates together with said case body, exceeds the resonant frequency, said automatic balancing apparatus reduces vibrations of said rotor; and the outer circumference of said ring magnet has a plurality of magnetized portions wherein the number of said magnetized portions is equal to or higher than the number of said balancing members.

20. The automatic balancing apparatus according to claim 7 wherein:

a shock absorbing member is placed on the outer circumference of said ring magnet to prevent said balancing member from directly colliding with said ring magnet and to reduce the impact of the collision of said balancing member;

the outer circumference of said shock absorbing member has a flat portion; and a magnetized portion is formed in the radial direction on said ring magnet corresponding to said flat portion.

21. The automatic balancing apparatus according to claim 10 wherein said shock absorbing member is made of a magnetic member.

22. The automatic balancing apparatus according to claim 7 wherein the outer circumference of said ring magnet has a part which is shaped as a regular polygon surrounding said support shaft.

* * * * *